United States Patent
Yamamoto et al.

(10) Patent No.: US 12,549,899 B2
(45) Date of Patent: Feb. 10, 2026

(54) NOTIFICATION SOUND GENERATION DEVICE

(71) Applicants: DENSO ELECTRONICS CORPORATION, Anjo (JP); TOYOTA JIDOSHA KABUSHIKI KAISHA, Toyota (JP)

(72) Inventors: Chikara Yamamoto, Anjo (JP); Tadashi Matsui, Toyota (JP)

(73) Assignees: DENSO ELECTRONICS CORPORATION, Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 18/337,823

(22) Filed: Jun. 20, 2023

(65) Prior Publication Data

US 2023/0353939 A1    Nov. 2, 2023

Related U.S. Application Data

(63) Continuation of application No. PCT/JP2021/044944, filed on Dec. 7, 2021.

(30) Foreign Application Priority Data

Dec. 22, 2020   (JP) .................. 2020-212731

(51) Int. Cl.
  *H04R 3/04* (2006.01)
  *B60Q 5/00* (2006.01)
  *H04R 1/02* (2006.01)

(52) U.S. Cl.
  CPC .............. *H04R 3/04* (2013.01); *B60Q 5/00* (2013.01); *H04R 1/025* (2013.01); *H04R 2499/13* (2013.01)

(58) Field of Classification Search
  CPC ....... H04R 2499/13; B60Q 5/00; B60Q 5/008
  See application file for complete search history.

(56) References Cited

U.S. PATENT DOCUMENTS

| | | | |
|---|---|---|---|
| 2010/0128887 A1* | 5/2010 | Lee | H04R 1/1041 381/74 |
| 2013/0257605 A1 | 10/2013 | Tsuzuki et al. | |
| 2018/0160227 A1* | 6/2018 | Lawrence | H04R 3/002 |
| 2019/0158970 A1 | 5/2019 | Konno et al. | |
| 2020/0215969 A1* | 7/2020 | Konno | B60R 11/02 |

FOREIGN PATENT DOCUMENTS

| | | |
|---|---|---|
| JP | 2013203209 A | 10/2013 |
| JP | 2014108727 A | 6/2014 |
| WO | WO-2017/110087 A1 | 6/2017 |

* cited by examiner

*Primary Examiner* — James K Mooney
(74) *Attorney, Agent, or Firm* — Harness, Dickey & Pierce, P.L.C.

(57) ABSTRACT

A notification sound generation device includes a speaker, a controller, a resistor, and a correction unit. The speaker is configured to generate a notification sound to surroundings of a vehicle. The controller is configured to output a sound signal that causes the speaker to generate the notification sound. The resistor has a resistance value corresponding to a correction amount for correcting a sound pressure variation of the speaker or a resistance value corresponding to a sound pressure value of the speaker. The correction unit is configured to correct the sound signal based on a physical quantity correlated with the resistance value of the resistor.

2 Claims, 4 Drawing Sheets

NOTIFICATION SOUND GENERATION DEVICE

CROSS REFERENCE TO RELATED APPLICATIONS

The present application is a continuation application of International Patent Application No. PCT/JP2021/044944 filed on Dec. 7, 2021, which designated the U.S. and claims the benefit of priority from Japanese Patent Application No. 2020-212731 filed on Dec. 22, 2020. The entire disclosures of all of the above applications are incorporated herein by reference.

TECHNICAL FIELD

The present disclosure relates to a notification sound generation device.

BACKGROUND

There has been known a notification device including a controller that generates a sound generation signal, and a speaker that generates a notification sound to surroundings of a vehicle in accordance with the sound generation signal generated by the controller.

SUMMARY

The present disclosure provides a notification sound generation device including a speaker, a controller, and a correction unit. The speaker is configured to generate a notification sound to surroundings of a vehicle. The controller is configured to output a sound signal that causes the speaker to generate the notification sound. The correction unit is configured to correct the sound signal based on a value related to a physical quantity of the speaker.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
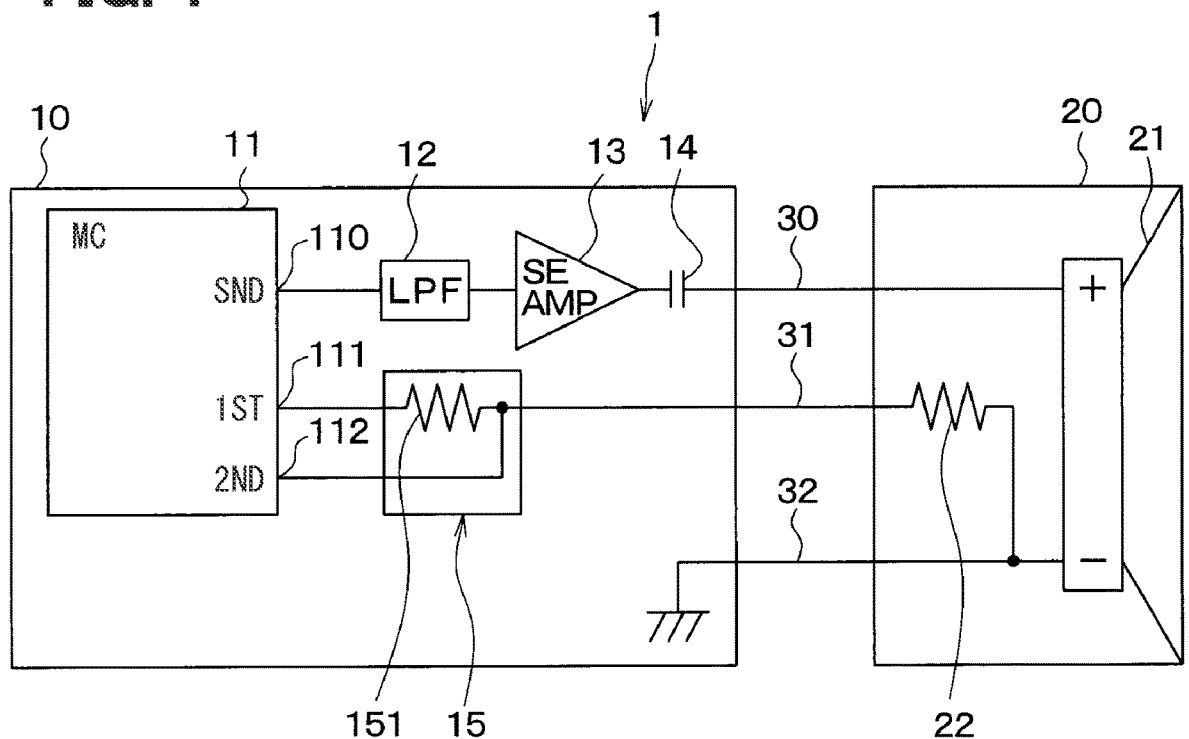
FIG. 1 is a block diagram of a notification sound generation device according to a first embodiment.

A notification device according to a relevant technology includes a controller and a speaker. The controller generates a sound generation signal. The speaker generates a notification sound to surroundings of a vehicle in accordance with the sound generation signal generated by the controller.

For the notification device as described above, a lower limit value of sound pressure to be emitted and the like are defined by laws and regulations such as the international standard of the UN-R138 and the United States Federal Motor Vehicle Safety Standard FMVSS 141. In order to reliably satisfy the lower limit value of the sound pressure to be emitted, it is necessary to set a sound pressure margin corresponding to a sound pressure variation due to manufacturing variation, aging, or the like.

For this reason, the volume of the speaker has to be set to be larger than the lower limit value of the sound pressure to be emitted, and the sound of the speaker may become traffic noise to the surroundings of the vehicle, or the sound of the speaker may be transmitted into a vehicle cabin to cause a decrease in quietness in the vehicle cabin.

Therefore, the inventors have considered specifying a correction amount from a measurement result of an initial characteristic of a speaker and managing the correction amount by a personal computer for each speaker, instead of setting the sound pressure margin corresponding to the sound pressure variation. In this method, the sound generation signal is corrected by reflecting the correction amount managed by the personal computer in a program of the controller.

However, in such a method, for example, in a case where a process of assembling the controller and the speaker to the vehicle is different, or in a case where it is necessary to replace the speaker or the controller after product shipment, management and operation of the correction amount become complicated, and the sound pressure of the notification sound cannot be easily corrected.

A notification sound generation device according to a first aspect of the present disclosure includes a speaker, a controller, a resistor, and a correction unit. The speaker is configured to generate a notification sound to surroundings of a vehicle. The controller is configured to output a sound signal that causes the speaker to generate the notification sound. The resistor has a resistance value corresponding to a correction amount for correcting a sound pressure variation of the speaker or a resistance value corresponding to a sound pressure value of the speaker. The correction unit is configured to correct the sound signal based on a physical quantity correlated with the resistance value of the resistor.

According to such a configuration, the sound signal is corrected based on the physical quantity correlated with the resistance value corresponding to the correction amount for correcting the sound pressure variation of the speaker or the resistance value of the resistor having the resistance value corresponding to the sound pressure value of the speaker. Therefore, it is possible to easily correct the sound pressure of the notification sound output from the speaker.

A notification sound generation device according to a second aspect of the present disclosure includes a speaker, a controller, a storage unit, and a correction unit. The speaker is configured to generate a notification sound to surroundings of a vehicle. The controller is configured to output a sound signal that causes the speaker to generate the notification sound. The storage unit stores at least one of a correction amount for correcting a sound pressure variation of the speaker or a sound pressure value of the speaker. The correction unit is configured to correct the sound signal based on the at the least one of the correction amount or the sound pressure value of the speaker stored in the storage unit.

According to such a configuration, the sound signal is corrected based on the at least one of the correction amount or the sound pressure value of the speaker stored in the storage unit. Therefore, it is possible to easily correct the sound pressure of the notification sound output from the speaker.

A notification sound generation device according to a third aspect of the present disclosure includes a speaker, a controller, a displacement sensor, and a correction unit. The speaker is configured to generate a notification sound to surroundings of a vehicle. The controller is configured to output a sound signal that causes the speaker to generate the notification sound. The displacement sensor is configured to detect a displacement amount due to vibration of the speaker and output a displacement signal corresponding to the displacement amount. The correction unit is configured to correct the sound signal based on the displacement amount detected by the displacement sensor.

According to such a configuration, the sound signal is corrected based on the displacement amount due to the vibration of the speaker detected by the displacement sensor. Therefore, it is possible to easily correct the sound pressure of the notification sound output from the speaker.

Embodiments of the present disclosure will be described below with reference to the drawings. In the following embodiments, the same or equivalent portions are denoted by the same reference numerals, and the description thereof will be omitted.

First Embodiment

Figure 2:
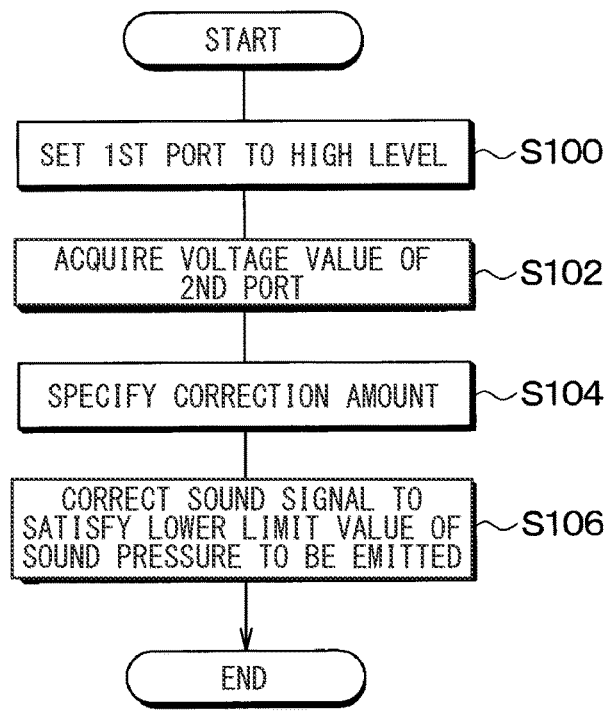
FIG. 2 is a flowchart showing a flow of processing executed by a controller in the notification sound generation device according to the first embodiment.

A notification sound generation device 1 according to a first embodiment will be described with reference to FIG. 1 and FIG. 2. The notification sound generation device 1 of the present embodiment is mounted on a vehicle and generates a notification sound to surroundings of the vehicle from a speaker 21.

The notification sound generation device 1 includes a controller 10 and a speaker device 20. In the notification sound generation device 1 of the present embodiment, the controller 10 and the speaker device 20 are configured as separate units.

The controller 10 includes a microcomputer (MC) 11, a low-pass filter (LPF) 12, an amplifier 13, a capacitor 14, and an interface circuit 15.

The microcomputer 11 is configured as a computer including a read-only memory (ROM), a random-access memory (RAM), an input-output part (I/O), and the like, and performs various kinds of processing in accordance with a program stored in the ROM. The microcomputer 11 of the present embodiment includes a digital-to-analog (DA) converter that converts a digital signal into an analog signal. The microcomputer 11 includes a sound output port (SND) 110 that outputs a sound signal, a first port (1ST) 111, and a second port (2ND) 112. The first port 111 is an output port for outputting signals, and the second port 112 is an input port for receiving signals.

The microcomputer 11 generates a sound signal for generating a notification sound from the speaker 21, and outputs the generated sound signal to the low-pass filter 12.

The low-pass filter 12 removes high-frequency components such as higher harmonics included in the sound signal and allows low-frequency components to pass through the low-pass filter 12. The low-pass filter 12 can be configured as, for example, a resistor-capacitor (RC) low-pass filter using a resistor and a capacitor.

The amplifier 13 is configured as a single-ended amplifier (SE AMP) that amplifies the sound signal input from one input terminal.

The capacitor 14 performs an alternating current (AC) coupling between an output terminal of the amplifier 13 and a positive terminal of the speaker 21. The capacitor 14 functions as a coupling capacitor, cuts a direct current (DC) component included in the output signal output from the output terminal of the amplifier 13, and passes only an AC component.

The interface circuit 15 includes a resistor 151. One end of the resistor 151 is connected to the first port 111 of the microcomputer 11, and the other end of the resistor 151 is connected to a resistor 22 of the speaker device 20 through a wire harness 31. The resistor 151 and the resistor 22 are connected in series between the first port 111 of the microcomputer 11 and a ground terminal.

A voltage at a connection point between the resistor 151 and the resistor 22 of the speaker device 20 is input to the second port 112 of the microcomputer 11. The resistor 151 has a predetermined fixed resistance value.

The speaker device 20 includes the speaker 21 and the resistor 22. The sound signal from the controller 10 is input to the positive terminal of the speaker 21 through the wire harness 30. A negative terminal of the speaker 21 is connected to a ground terminal in the controller 10 through a wire harness 32, and is grounded.

The wire harness 32 connects a connection point between the negative terminal of the speaker 21 and the resistor 22 to the ground terminal in the controller 10. Therefore, as compared with a case where the ground of the resistor 22 and the ground of the speaker 21 are connected to the ground terminal in the controller 10 through separate connection lines, the number of connection lines can be reduced, and the cost for wiring can also be reduced.

The resistor 22 and the speaker 21 are disposed in a housing of the speaker device 20, and a resistance value of the resistor 22 corresponds to a correction amount for correcting a sound pressure variation of the speaker 21.

The notification sound generation device 1 of the present embodiment is intended to correct variations in overall sound pressure values of the speaker device 20. The overall sound pressure value refers to a sound pressure value including all frequency components.

The speaker device 20 of the notification sound generation device 1 includes the resistor 22 that has the resistance value corresponding to the correction amount corresponding to the overall sound pressure value.

Specifically, in a manufacturing and shipping inspection of the speaker device 20, an operator inputs a reference sound signal to the speaker 21 to drive the speaker 21 and measures the overall sound pressure value at the time as an initial characteristic of the speaker 21.

Next, the operator determines the correction amount corresponding to the overall sound pressure value according to a map indicating a correspondence relationship between the overall sound pressure value and the correction amount. Further, the operator determines the resistance value of the resistor 22 corresponding to the correction amount of the overall sound pressure value according to a map indicating a correspondence relationship between the correction amount and the resistance value of the resistor 22.

Thereafter, the operator mounts the resistor 22 having the determined resistance value in the speaker device 20. For example, the resistor 22 having a large resistance value is mounted on the speaker 21 having a large sound pressure, and the resistor 22 having a small resistance value is mounted on the speaker 21 having a small sound pressure. While a resistance value of the resistor 151 provided in the interface circuit 15 of the controller 10 is constant, the resistance value of the resistor 22 varies depending on the sound pressure variation of each speaker 21.

Next, a flow of processing executed by the microcomputer 11 of the notification sound generation device 1 will be described with reference to FIG. 2. Hereinafter, the flow of the processing executed by the microcomputer 11 in each embodiment will be described as a flow of processing executed by the controller 10. For example, the notification sound generation device 1 enters an operation state when an ignition switch of the vehicle is turned on, and the controller 10 periodically executes the flow of the processing shown in FIG. 2.

First, at S100, the controller 10 outputs a high-level signal from the first port 111 of the microcomputer 11. The voltage of the high-level signal is 5 volts. However, the voltage of the high-level signal may be other than 5 volts, such as 3.3 volts.

Next, at S102, the controller 10 acquires a voltage value of the second port 112 as a physical quantity correlated with the resistance value of the resistor 22. A voltage obtained by dividing the voltage of the high-level signal output from the first port 111 of the microcomputer 11 by the resistor 151 and the resistor 22 is input to the second port 112. Since the resistance value of the resistor 22 is the resistance value corresponding to the correction amount for correcting the sound pressure variation of the speaker 21, the voltage of the second port 112 is a voltage corresponding to the correction amount for correcting the sound pressure variation of the speaker 21.

Next, at S104, the controller 10 specifies the correction amount. The ROM of the microcomputer 11 stores a map indicating a correspondence relationship between the correction amount for correcting the sound pressure variation of the speaker 21 and the voltage of the second port 112. The controller 10 specifies the correction amount from the voltage of the second port 112 in accordance with the map. This map takes into account the lower limit value of the sound pressure to be emitted, which is defined by the laws and the regulations described above.

Next, at S106, the controller 10 corrects the sound signal to be output from the sound output port 110 of the microcomputer 11 using the correction amount specified at S104. By correcting the sound signal in this way, the amplitude of the sound signal changes. When the sound signal passes through the low-pass filter 12, the high-frequency component such as the higher harmonics included in the sound signal is removed, and then the sound signal is amplified by the amplifier 13. The sound signal amplified by the amplifier 13 is input to the speaker 21 through the capacitor 14 and the wire harness 30. As a result, the notification sound corresponding to the sound signal corrected so as to satisfy the lower limit value of the sound pressure to be emitted and reduce the sound pressure variation is output from the speaker 21 to the surroundings of the vehicle.

As described above, the notification sound generation device 1 of the present embodiment is configured to complete the correction of the sound signal in the notification sound generation device 1 and to stably satisfy the lower limit value of the sound pressure to be emitted without setting the sound pressure margin for the sound pressure variation due to the manufacturing variation, the secular change, or the like.

As described above, the notification sound generation device 1 of the present embodiment includes the speaker 21 that generates the notification sound around the vehicle, and the controller 10 that outputs the sound signal for causing the speaker 21 to generate the notification sound. The notification sound generation device 1 further includes the resistor 22 having the resistance value corresponding to the correction amount for correcting the sound pressure variation of the speaker 21, and a correction unit that corrects the sound signal based on the physical quantity correlated with the resistance value of the resistor 22.

According to such a configuration, the sound signal is corrected based on the physical quantity correlated with the resistance value that corresponds to the correction amount for correcting the sound pressure variation of the speaker 21. Therefore, it is possible to easily correct the sound pressure of the notification sound output from the speaker 21.

In the present embodiment, the correction amount for correcting the sound pressure variation of the speaker 21 is specified based on the physical quantity correlated with the resistance value, and the sound signal is corrected based on the correction amount.

As described above, the sound signal can be corrected based on the correction amount specified based on the physical quantity correlated with the resistance value.

In the present embodiment, when the resistor 22 is defined as a first resistor, the notification sound generation device 1 includes the resistor 151 as a second resistor connected in series with the first resistor. Then, a correction amount specifying unit acquires a voltage value obtained by dividing the predetermined voltage by the first resistor and the second resistor as the physical quantity correlated with the resistance value of the resistor 22, and specifies the correction amount based on the voltage value.

Therefore, the correction amount can be specified with a simple configuration, and the sound signal can be corrected based on the correction amount.

Second Embodiment

Figure 3:
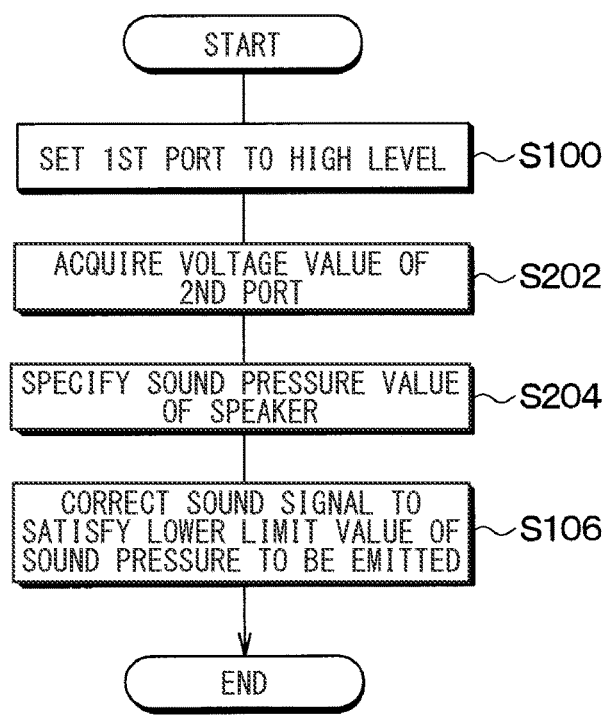
FIG. 3 is a flowchart showing a flow of processing executed by a controller in a notification sound generation device according to a second embodiment.

A notification sound generation device 1 according to a second embodiment will be described with reference to FIG. 3. In the notification sound generation device 1 of the first embodiment, the resistor 22 having the resistance value corresponding to the correction amount corresponding to the overall sound pressure value of the speaker 21 is incorporated in the speaker device 20. In contrast, the notification sound generation device 1 of the present embodiment incorporates a resistor 22 having a resistance value corresponding to the overall sound pressure value of the speaker 21 into the speaker device 20. That is, in the notification sound generation device 1, the resistance value of the resistor 22 corresponds to the overall sound pressure value of the speaker 21. The controller 10 specifies the sound pressure value of the speaker 21 from the voltage corresponding to the resistance value of the resistor 22 input to the second port 112 of the microcomputer 11, and corrects the sound signal based on the sound pressure value.

Next, a flow of processing executed by the microcomputer 11 of the notification sound generation device 1 of the present embodiment will be described with reference to FIG. 3.

First, at S100, the controller 10 outputs a high-level signal from the first port 111 of the microcomputer 11.

Next, at S202, the controller 10 acquires a voltage value of the second port 112 as a physical quantity correlated with the resistance value of the resistor 22. A voltage obtained by dividing the voltage of the high-level signal output from the first port 111 of the microcomputer 11 by the resistor 151 and the resistor 22 is input to the second port 112. In the present embodiment, since the resistance value of the resistor 22 corresponds to the sound pressure value of the speaker 21, the voltage of the second port 112 is a voltage corresponding to the sound pressure value of the speaker 21.

Next, at S204, the controller 10 specifies the sound pressure value of the speaker 21. The ROM of the microcomputer 11 stores a map indicating a correspondence relationship between the sound pressure value of the speaker 21 and the voltage of the second port 112. The controller 10 specifies the sound pressure value of the speaker 21 from the voltage of the second port 112 in accordance with the map. This map also takes into account the lower limit value of the sound pressure to be emitted, which is defined by the laws and the regulations described above.

Next, at S106, the controller 10 corrects the sound signal output from the sound output port 110 of the microcomputer 11 using the sound pressure value of the speaker 21 specified at S204.

As described above, the notification sound generation device 1 of the present embodiment includes the speaker 21 that generates the notification sound around the vehicle, and the controller 10 that outputs the sound signal for causing the speaker 21 to generate the notification sound. The notification sound generation device 1 further includes the resistor 22 having the resistance value corresponding to the sound pressure value of the speaker 21, and a correction unit that corrects the sound signal based on the physical quantity correlated with the resistance value of the resistor 22.

According to such a configuration, the sound signal is corrected based on the physical quantity correlated with the resistance value corresponding to the sound pressure value of the speaker 21. Therefore, it is possible to easily correct the sound pressure of the notification sound output from the speaker 21.

In the present embodiment, the notification sound generation device 1 further includes a sound pressure value specifying unit that specifies the sound pressure value of the speaker 21 based on the physical quantity correlated with the resistance value, and the correction unit corrects the sound signal based on the sound pressure value of the speaker specified by the sound pressure value specifying unit.

As described above, the sound signal can be corrected based on the sound pressure value of the speaker 21 specified based on the physical quantity correlated with the resistance value.

In the present embodiment, when the resistor 22 is defined as a first resistor, the notification sound generation device 1 includes the resistor 151 as a second resistor connected in series with the resistor 22 as the first resistor. Then, the sound pressure value specifying unit acquires, as the physical quantity correlated with the resistance value of the first resistor, the voltage value obtained by dividing the predetermined voltage by the first resistor and the second resistor, and specifies the sound pressure value of the speaker based on the voltage value.

Therefore, the sound pressure value of the speaker 21 can be specified with a simple configuration, and the sound signal can be corrected based on the sound pressure value of the speaker 21.

Third Embodiment

Figure 4:
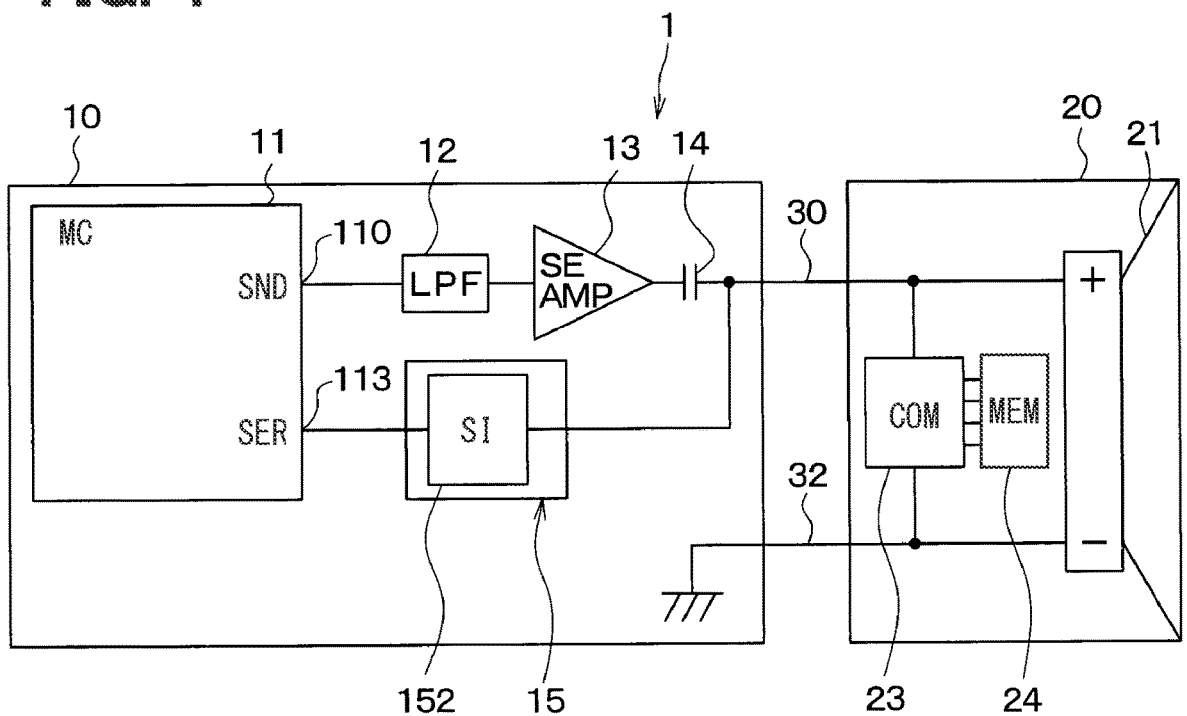
FIG. 4 is a block diagram of a notification sound generation device according to a third embodiment.
Figure 5:
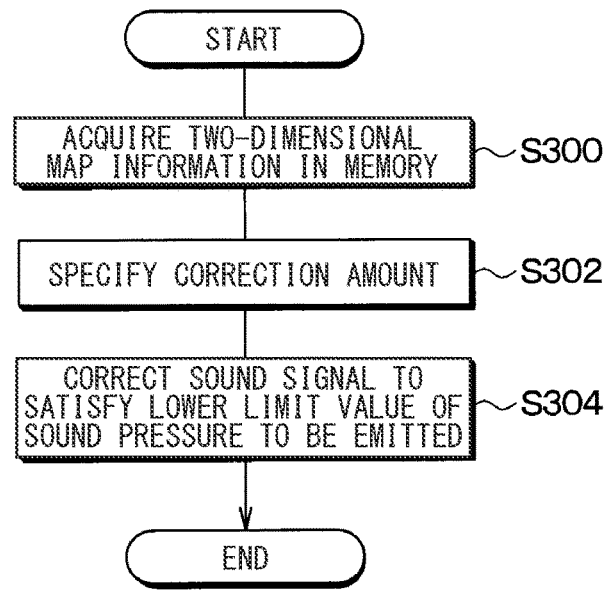
FIG. 5 is a flowchart showing a flow of processing executed by a controller in the notification sound generation device according to the third embodiment.

A configuration of a notification sound generation device 1 according to a third embodiment is shown in FIG. 4 to FIG. 5. The notification sound generation devices 1 of the first and second embodiments are intended to correct the overall sound pressure of the speaker 21, and correct the sound signal based on the voltage value of the connection point between the resistor 151 and the resistor 22 of the speaker device 20 input to the second port 112 of the microcomputer 11. On the other hand, the notification sound generation device 1 of the present embodiment is intended to correct a frequency characteristic of the sound pressure of the speaker 21, and a memory 24 storing two-dimensional map information representing the frequency characteristic of the sound pressure of the speaker 21 is disposed inside the speaker 21. The microcomputer 11 corrects the sound signal based on the two-dimensional map information stored in the memory 24. The memory 24 corresponds to a storage unit.

As shown in FIG. 4, the speaker 21 of the present embodiment includes a communication circuit (COM) 23 and a memory (MEM) 24 instead of the resistor 22 of the speaker device 20 of the first embodiment. The interface circuit 15 of the controller 10 of the present embodiment includes a superimposing circuit (SI) 152 instead of the resistor 151 of the first embodiment. The microcomputer 11 of the controller 10 of the present embodiment includes a sound output port (SND) 110 and a serial communication port (SER) 113. The communication circuit 23 and the memory 24 are supplied with power from the controller 10 through the wire harness 30. The speaker 21, the communication circuit 23, and the memory 24 are accommodated in a housing of the speaker device 20.

The memory 24 stores the two-dimensional map information representing the frequency characteristics of the sound pressure of the speaker 21. The two-dimensional map information reflects the measurement result of the initial characteristics of the speaker 21.

The communication circuit 23 reads data stored in the memory 24 and periodically transmits the read data to the superimposing circuit 152 of the controller 10 by serial communication.

In the notification sound generation device 1, the sound signal is transmitted from the controller 10 to the speaker 21 through the wire harness 30. The communication circuit 23 of the present embodiment superimposes data read from the memory 24 on the wire harness 30 with respect to the sound signal. Furthermore, the controller 10 superimposes a signal for supplying power to the communication circuit 23 and the memory 24 on the wire harness 30.

A frequency band of the sound signal is about 100 to 5000 hertz, and a communication frequency band of the serial communication from the communication circuit 23 to the superimposing circuit 152 of the controller 10 is inaudible 20 kilohertz or more. A signal in an inaudible frequency band of 20 hertz or less is used for power supply from the controller 10 to the communication circuit 23 and the memory 24 of the speaker 21.

Next, a flow of processing executed by the microcomputer 11 of the notification sound generation device 1 of the present embodiment will be described with reference to FIG. 5.

First, at S300, the controller 10 acquires the two-dimensional map information stored in the memory 24. Specifically, the controller 10 acquires the two-dimensional map information transmitted from the communication circuit 23 through serial communication.

Next, at S302, the controller 10 specifies a correction amount based on the two-dimensional map information acquired at S300. For example, when the sound pressure of the frequency characteristic of the sound pressure of the speaker 21 obtained from the two-dimensional map information is small as a whole, the correction amount of the sound signal is specified such that the amplitude of the sound signal increases. On the other hand, when the sound pressure of the frequency characteristic of the sound pressure of the speaker 21 obtained from the two-dimensional map information is large as a whole, the correction amount of the sound signal is specified such that the amplitude of the sound signal decreases. Note that the correction amount of the sound signal can be specified so as to increase or decrease only the sound pressure in a specific frequency band.

Next, at S304, the controller 10 corrects the sound signal to be output from the sound output port 110 of the microcomputer 11 using the correction amount specified at S302. By correcting the sound signal in this way, the amplitude of the sound signal changes. When the sound signal passes through the low-pass filter 12, the high-frequency component such as the higher harmonics included in the sound signal is removed, and then the sound signal is amplified by the amplifier 13. The sound signal amplified by the amplifier 13 is input to the speaker 21 through the capacitor 14 and the wire harness 30. As a result, the notification sound corresponding to the sound signal corrected so as to satisfy the lower limit value of the sound pressure to be emitted and reduce the sound pressure variation is output from the speaker 21 to the surroundings of the vehicle.

As described above, the notification sound generation device 1 of the present embodiment includes the speaker 21 that generates the notification sound to the surroundings of the vehicle, and the controller 10 that outputs the sound signal for generating the notification sound to the speaker 21. In addition, the notification sound generation device 1 includes the memory 24 that stores at least one of a correction amount for correcting the sound pressure variation of the speaker 21 or the sound pressure value of the speaker. The notification sound generation device 1 further includes a correction unit that corrects the sound signal based on the at least one of the correction amount or the sound pressure value of the speaker stored in the memory 24.

According to such a configuration, the sound signal is corrected based on the at least one of the correction amount for correcting the sound pressure variation of the speaker 21 or the sound pressure value of the speaker 21 stored in the memory 24. Therefore, it is possible to easily correct the sound pressure of the notification sound output from the speaker 21.

In the present embodiment, the wire harness 30 that transmits the sound signal output from the controller 10 to the speaker 21 is provided. A signal representing at least one of the correction amount or the sound pressure value of the speaker 21 read from the memory 24 is superimposed on the wire harness 30.

Since it is not necessary to newly provide wiring for transmitting the signal representing the at least one of the correction amount or the sound pressure value of the speaker 21 read from the memory 24 to the controller 10, it is possible to reduce the cost for wiring between the controller 10 and the speaker 21.

Fourth Embodiment

Figure 6:
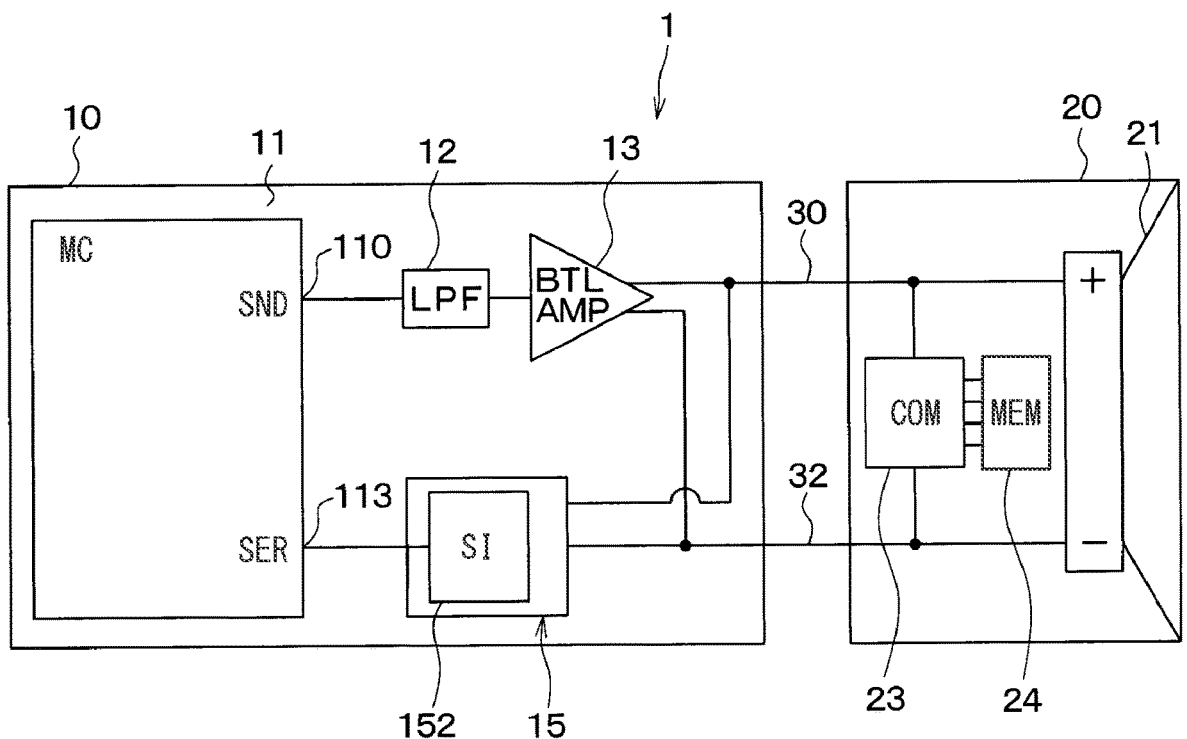
FIG. 6 is a block diagram of a notification sound generation device according to a fourth embodiment.

A notification sound generation device 1 according to a fourth embodiment will be described with reference to FIG. 6. In the first to third embodiments, the amplifier 13 is configured by the single-ended amplifier, but the amplifier 13 of the notification sound generation device 1 of the present embodiment is configured by a BTL connection amplifier (BTLAMP). Note that BTL is an abbreviation for Bridged Tied Load.

The BTL connection amplifier has two built-in power amplifiers, and the speaker 21 is connected between outputs of the two power amplifiers. That is, one output of the two power amplifiers is connected to the positive terminal of the speaker 21 through the wire harness 30, and the other output of the two power amplifiers is connected to the negative terminal of the speaker 21 through the wire harness 32. As described above, the amplifier 13 may be configured by the BTL connection amplifier.

The communication circuit 23 reads data stored in the memory 24, superimposes the read data on the wire harnesses 30 and 32, and periodically transmits the data to the superimposition circuit 152 of the controller 10 by serial communication.

Even when the amplifier 13 is configured by the BTL connection amplifier, at least one of the correction amount for correcting the sound pressure variation of the speaker 21 or the sound pressure value of the speaker 21 stored in the memory 24 can be superimposed on the wire harness 30.

Fifth Embodiment

A notification sound generation device 1 according to a fifth embodiment will be described with reference to FIG. 7 and FIG. 8. In the notification sound generation device 1 of the present embodiment, a displacement sensor (DISP) 25 that outputs a displacement signal corresponding to a displacement amount of the speaker 21 due to the vibration of the speaker 21 is provided inside the speaker 21, and the microcomputer 11 corrects the sound signal based on the displacement signal output from the displacement sensor 25.

Figure 7:
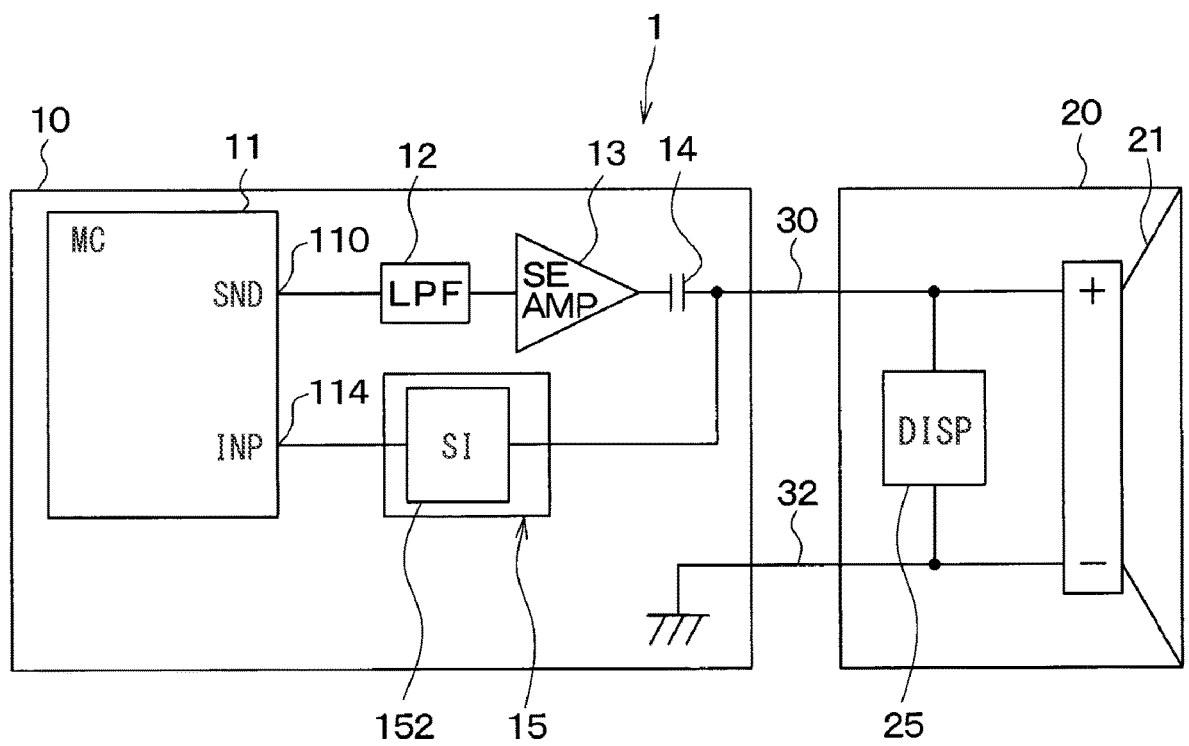
FIG. 7 is a block diagram of a notification sound generation device according to a fifth embodiment.
Figure 8:
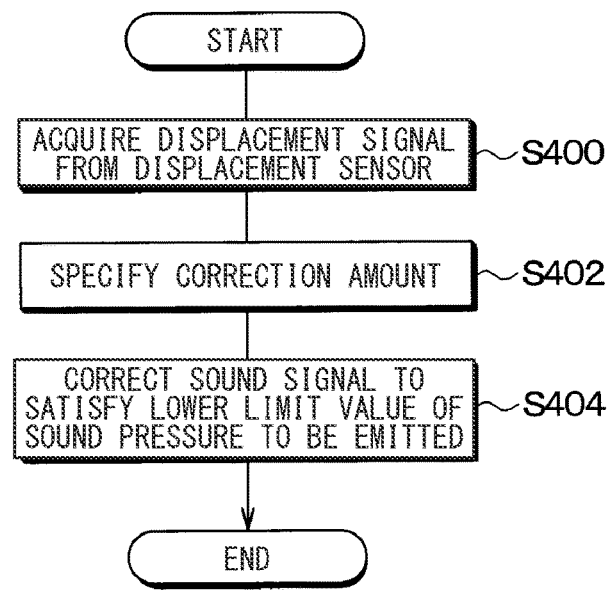
FIG. 8 is a flowchart showing a flow of processing executed by a controller in the notification sound generation device according to the fifth embodiment.

As shown in FIG. 7, the speaker device 20 of the present embodiment includes the displacement sensor 25. The interface circuit 15 of the controller 10 of the present embodiment includes the superimposing circuit 152 same as that of the third embodiment. The microcomputer 11 of the controller 10 of the present embodiment includes a sound output port (SND) 110 and an input port (INP) 114. The displacement sensor 25 is supplied with power from the controller 10 through the wire harness 30.

The displacement sensor 25 is disposed inside the speaker 21. The speaker 21 includes a diaphragm and a voice coil, and generates a notification sound by the diaphragm vibrating when a current flows through the voice coil. The displacement sensor 25 detects a displacement amount of the diaphragm of the speaker 21, and outputs a displacement signal whose frequency changes according to the displacement amount. The displacement sensor 25 superimposes the displacement signal on the wire harness 30.

The displacement sensor 25 may be disposed so as to detect a displacement amount of the voice coil of the speaker 21. Alternatively, the displacement sensor 25 may be configured so as to detect the displacement amounts of both the diaphragm and the voice coil of the speaker 21.

The superimposing circuit 152 receives the displacement signal superimposed on the wire harness 30 by the displacement sensor 25, converts the received displacement signal into an analog signal representing the magnitude of the displacement amount, and outputs the analog signal to the microcomputer 11.

The displacement amounts of the diaphragm and the voice coil of the speaker 21 are proportional to the amount of air pushed out by the diaphragm, and thus have high correlation with the sound pressure of the speaker 21. In the notification sound generation device 1 of the present embodiment, the displacement amount of the diaphragm or the voice coil of the speaker 21 having high correlation with the sound pressure of the speaker 21 is detected by the displacement sensor 25. The controller 10 acquires the displacement amount detected by the displacement sensor 25 from the displacement sensor 25, and reflects the correction amount corresponding to the displacement amount in the sound signal.

Next, a flow of processing executed by the microcomputer 11 of the notification sound generation device 1 of the present embodiment will be described with reference to FIG. 8.

First, at S400, the controller 10 acquires the displacement signal from the displacement sensor 25. Specifically, when the displacement signal output from the displacement sensor 25 and superimposed on the wire harness 30 is received by the superimposing circuit 152, a signal obtained by converting the displacement signal from the displacement sensor 25 into the analog signal is input from the superimposing circuit 152 to the input port 114 of the microcomputer 11. The controller 10 acquires the signal corresponding to the displacement signal and input to the input port 114 of the microcomputer 11.

Next, at S402, the controller 10 specifies a correction amount based on the signal corresponding to the displacement signal acquired in S400.

Next, at S404, the controller 10 corrects the sound signal to be output from the sound output port 110 of the microcomputer 11 using the correction amount specified at S402.

The notification sound generation device 1 of the present embodiment can correct the sound signal by detecting the displacement amount of the diaphragm or the voice coil of the speaker 21 at any timing. Therefore, the sound signal can be corrected based on the displacement amount of the diaphragm or the voice coil of the speaker 21 not only at the time of product shipment but also after product shipment. Therefore, a stable sound pressure of the speaker 21 can be secured, and the sound pressure margin can be further reduced.

As described above, the notification sound generation device 1 of the present embodiment includes the speaker 21 that generates the notification sound to the surroundings of the vehicle, and the controller 10 that outputs the sound signal for generating the notification sound to the speaker 21. The notification sound generation device 1 further includes the displacement sensor 25 that detects the displacement amount due to vibration of the speaker 21 and outputs the displacement signal according to the displacement amount, and a correction unit that corrects the sound signal based on the displacement amount detected by the displacement sensor 25.

According to such a configuration, the sound signal is corrected based on the displacement amount due to the vibration of the speaker 21 detected by the displacement sensor 25. Therefore, it is possible to easily correct the sound pressure of the notification sound output from the speaker 21.

In the present embodiment, the wire harness 30 that transmits the sound signal output from the controller 10 to the speaker 21 is provided, and the displacement signal output from the displacement sensor 25 is superimposed on the wire harness 30.

Since it is not necessary to newly provide wiring for transmitting the displacement signal output from the displacement sensor 25 to the controller 10, it is possible to reduce the cost for wiring between the controller 10 and the speaker 21.

Sixth Embodiment

A notification sound generation device 1 according to a sixth embodiment will be described. In the first embodiment, the correction amount for correcting the sound pressure variation of the speaker 21 is specified based on the voltage value at the connection point between the resistor 22 and the resistor 151 input to the second port 112 of the microcomputer 11. That is, the correction amount is specified by setting the voltage value at the connection point between the resistor 22 and the resistor 151 input to the second port 112 of the microcomputer 11 as the physical quantity correlated with the resistance value of the resistor 22.

In contrast, in the notification sound generation device 1 of the present embodiment, the controller 10 includes a constant current source (not shown) that causes a constant current to flow through the resistor 22, and a voltmeter (not shown) that detects a voltage between terminals of the resistor 22. The resistance value of the resistor 22 corresponds to the correction amount for correcting the sound pressure variation of the speaker 21.

When a constant current flows from the constant current source to the resistor 22, the voltage across the terminals of the resistor 22 is detected by the voltmeter, and the controller 10 reads the voltage across the terminals of the resistor 22. The controller 10 corrects the sound signal based on the voltage between the terminals of the resistor 22.

As described above, the correction amount can be specified by using the voltage between the terminals of the resistor 22 detected by the voltmeter when the constant current is caused to flow from the constant current source to the resistor 22 as the physical quantity correlated with the resistance value of the resistor 22.

As in the second embodiment, the resistance value of the resistor 22 may correspond to the sound pressure value of the speaker 21.

Seventh Embodiment

A notification sound generation device 1 according to a seventh embodiment will be described. In the notification sound generation device 1 of the present embodiment, the controller 10 includes an ammeter (not shown) that measures a current flowing through the resistor 22, the value of the current flowing through the resistor 22 when a predetermined voltage is applied to the resistor 22 is measured by the ammeter, and the controller 10 reads the current value. Then, the controller 10 corrects the sound signal based on the current value of the current flowing through the resistor 22.

As described above, the correction amount can be specified by using the value of the current flowing through the resistor 22 detected by the ammeter when the predetermined voltage is applied to the resistor 22 as the physical quantity correlated with the resistance value of the resistor 22.

As in the second embodiment, the resistance value of the resistor 22 may correspond to the sound pressure value of the speaker 21.

Other Embodiments

In the first embodiment, one resistor 22 is provided in the speaker 21, but the resistor 22 may be configured by multiple resistors. Alternatively, the resistor 22 may include a variable resistor whose resistance value can be adjusted.

In the above-described embodiments, the controller 10 and the speaker 21 are configured separately, but the controller 10 and the speaker 21 may be configured integrally.

In the fifth embodiment, an example in which the displacement sensor 25 is disposed inside the speaker 21 has been described, but the disposition of the displacement sensor 25 is not limited to the inside of the speaker 21, and for example, the displacement sensor 25 may be disposed outside the housing of the speaker 21.

The present disclosure is not limited to the above-described embodiments and may be suitably modified. The above-described embodiments are not independent of each other, and can be appropriately combined except when the combination is obviously impossible. In each of the above-described embodiments, individual elements or features of a particular embodiment are not necessarily essential unless it is specifically stated that the elements or the features are essential, or unless the elements or the features are obviously essential in principle. Further, in each of the above-described embodiments, when numerical values such as the number, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, a material, a shape, a positional relationship, or the like, if specified in the above-described embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

In the above-described embodiment, the processing at S104, S304, and S404 corresponds to the correction unit, the processing at S102 and S104 corresponds to the correction amount specifying unit, the processing at S202 and S204 corresponds to the sound pressure value specifying unit, and the memory 24 corresponds to the storage unit.

What is claimed is:

1. A notification sound generation device comprising:
a speaker configured to generate a notification sound to surroundings of a vehicle;
a controller configured to output a sound signal that causes the speaker to generate the notification sound;
a first resistor having a resistance value corresponding to a correction amount for correcting a sound pressure variation of the speaker; and
a second resistor connected in series with the first resistor, wherein
the controller is further configured to
acquire, as a physical quantity correlated with the resistance value of the first resistor, a voltage value obtained by dividing a predetermined voltage by the first resistor and the second resistor, and specify the correction amount for correcting the sound pressure variation of the speaker based on the voltage value, and
correct the sound signal based on the correction amount that is specified.

2. A notification sound generation device comprising:
a speaker configured to generate a notification sound to surroundings of a vehicle;
a controller configured to output a sound signal that causes the speaker to generate the notification sound;
a first resistor having a resistance value corresponding to a sound pressure value of the speaker; and
a second resistor connected in series with the first resistor, wherein
the controller is further configured to
acquire, as a physical quantity correlated with the resistance value of the first resistor, a voltage value obtained by dividing a predetermined voltage by the first resistor and the second resistor, and specify the sound pressure value of the speaker based on the voltage value, and
correct the sound signal based on the sound pressure value of the speaker that is specified.

* * * * *